United States Patent
Zheng et al.

(10) Patent No.: US 10,620,741 B2
(45) Date of Patent: Apr. 14, 2020

(54) INTEGRATED TOUCH CONTROL DISPLAY PANEL AND INTEGRATED TOUCH CONTROL DISPLAY DEVICE COMPRISING THE SAME

(71) Applicants: Xiamen Tianma Micro-Electronics Co., Ltd, Xiamen (CN); Tianma Micro-Electronics Co., Ltd., Shenzhen (CN)

(72) Inventors: Chao Zheng, Xiamen (CN); Mingchao Hou, Xiamen (CN); Zhiwei Zheng, Xiamen (CN); Kangpeng Yang, Xiamen (CN); Yumin Xu, Xiamen (CN)

( * ) Notice: Subject to any disclaimer, the term of this patent is extended or adjusted under 35 U.S.C. 154(b) by 101 days.

(21) Appl. No.: 15/375,183

(22) Filed: Dec. 12, 2016

(65) Prior Publication Data

US 2017/0090664 A1    Mar. 30, 2017

(30) Foreign Application Priority Data

Jul. 29, 2016 (CN) .......................... 2016 1 0617665

(51) Int. Cl.
*G06F 3/041* (2006.01)
*G06F 3/044* (2006.01)
*G02F 1/1333* (2006.01)

(52) U.S. Cl.
CPC ............ *G06F 3/0416* (2013.01); *G06F 3/044* (2013.01); *G06F 3/0412* (2013.01); *G02F 1/13338* (2013.01); *G06F 2203/04112* (2013.01)

(58) Field of Classification Search
None
See application file for complete search history.

(56) References Cited

U.S. PATENT DOCUMENTS

| 2011/0102361 A1* | 5/2011 | Philipp | .................. | G06F 3/044 345/174 |
| 2015/0169109 A1* | 6/2015 | Park | ....................... | G06F 3/044 345/174 |

(Continued)

FOREIGN PATENT DOCUMENTS

| CN | 101976146 A | 2/2011 |
| CN | 104571687 A | 4/2015 |
| CN | 205193763 U | 4/2016 |

OTHER PUBLICATIONS

CN First Office Action dated May 28, 2018 in the corresponding Chinese application (application No. 201610617665.6).

*Primary Examiner* — Stephen T. Reed
(74) *Attorney, Agent, or Firm* — Kilpatrick Townsend & Stockton, LLP

(57) ABSTRACT

The present application discloses an integrated touch control display panel and an integrated touch control display device comprising the same. A specific embodiment of the integrated touch control display panel comprises a plurality of touch control sensing electrodes extending along a first direction and disposed along a second direction. The touch control sensing electrode has a grid structure, and comprises a plurality of electrically connected metal electrodes. The metal electrode comprises a plurality of electrically connected sub-metal electrodes, and the sub-metal electrode has a width of a, wherein a is less than or equal to 3 micrometer (3 μm) and is greater than or equal to 2.5 micrometer (2.5 μm). In this embodiment, the blocking effect of the grid touch control sensing electrodes on the light in a display region is attenuated, and thereby display effect is improved.

14 Claims, 8 Drawing Sheets

(56) References Cited

U.S. PATENT DOCUMENTS

| | | | | |
|---|---|---|---|---|
| 2015/0234509 A1* | 8/2015 | Guard | .................. | G06F 3/0412 |
| | | | | 345/174 |
| 2016/0092004 A1* | 3/2016 | Yoshiki | .................. | G06F 3/047 |
| | | | | 345/174 |
| 2016/0246393 A1* | 8/2016 | Lee | ......................... | G06F 3/044 |
| 2017/0139522 A1* | 5/2017 | Gong | .................... | G06F 3/0412 |

* cited by examiner

INTEGRATED TOUCH CONTROL DISPLAY PANEL AND INTEGRATED TOUCH CONTROL DISPLAY DEVICE COMPRISING THE SAME

CROSS-REFERENCE TO RELATED APPLICATION

This application claims priority of Chinese Patent Application No. 201610617665.6, filed on Jul. 29, 2016 in the State Intellectual Property Office (SIPO) of China, the contents of which are herein incorporated by reference in their entirety.

TECHNICAL FIELD

The present application relates to the technical field of display technologies, and particularly to an integrated touch control display panel and an integrated touch control display device comprising the same.

BACKGROUND

Based on the touch control principles, capacitive touch screens can be classified into self-capacitive touch display screens and mutual-capacitive touch display screens. In the mutual-capacitive touch display screen, touch control emitting electrodes and touch sensing electrodes on a display panel intersect in the display region, and a mutual capacitor is formed at the intersections. If a signal is provided to the touch control emitting electrode, the signal can be sensed, upon which the charges generated from sensing can be stored by the mutual capacitor. The number of charges stored in the mutual capacitor changes during a touch control process, such that the signal strength sensed by the touch control sensing electrode varies. As such, whether touch control occurs can be determined by detecting the signal strength sensed by the touch control sensing electrode. Further, the touch control position can be determined based on the intersection sensed by the mutual capacitor where the variation in signal strength takes place, thereby achieving the touch control function.

Some existing touch control sensing electrodes are formed with metal wires that parallel or intersect with each other. The direction of the wiring is inconsistent with the disposition direction of the black matrix. Generally, the metal wiring runs through an opening region in the display panel where pixel electrodes reside, and the metal wire has a large line width that is generally greater than 3 μm. The metal wire has a blocking effect on the light in the region where the metal wire runs through during display, such that the light transmittance is reduced, and causing an impact on the display effect.

SUMMARY

In view of the disadvantages existing in the related art, an embodiment of the present application provides an integrated touch control display panel and an integrated touch control display device comprising the same, so as to solve the technical problems mentioned in the background.

To achieve the above objectives, in a first aspect, an embodiment of the present application provides an integrated touch control display panel, including a plurality of touch control sensing electrodes extending along a first direction and arranged along a second direction. Each of the touch control sensing electrode has a grid structure and includes a plurality of electrically connected metal electrodes. Each of the metal electrode includes a plurality of electrically connected sub-metal electrodes, and the sub-metal electrode has a width of a, where 2.5 μm≤a≤3 μm.

In a second aspect, the present application provides an integrated touch control display device, including the integrated touch control display panel.

In the integrated touch control display panel and the integrated touch control display device comprising the same provided in the present application, the width of the metal electrodes in the touch control sensing electrode is reduced, such that the blocking effect of the touch control sensing electrodes on the light in a display region is attenuated, thereby facilitating the improvement of the display effect.

BRIEF DESCRIPTION OF THE DRAWINGS

Other features, purposes and advantages of the present application will become more apparent from a reading of the detailed description of the non-limiting embodiments, said description being given in relation to the accompanying drawings, in which.

DETAILED DESCRIPTION OF PREFERRED EMBODIMENTS

The present application will be described below in further detail with reference to the accompanying drawings and embodiments. It should be understood that the specific embodiments described herein is only intended to explain the present disclosure and is not taken to limit the present disclosure. Further, it should be noted that for ease of description, the diagram shows only the parts that are pertinent to the disclosure.

It should be noted that in case of no conflicts, the embodiments and features thereof in the present application may be combined with each other. The present application will be described below in detail with reference to the accompanying drawings and embodiments.

Figure 1:
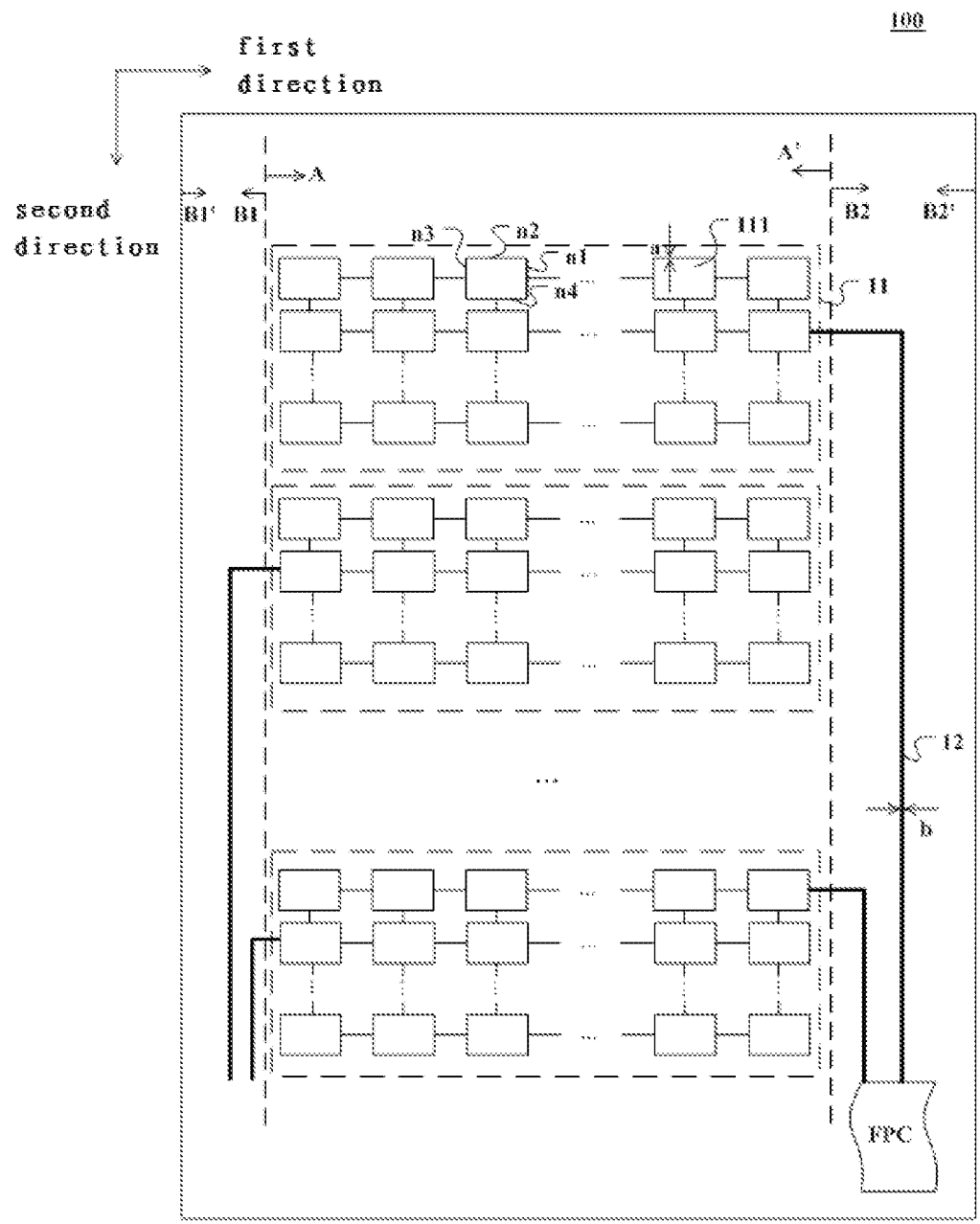
FIG. 1 is a schematic structural diagram of an embodiment of an integrated touch control display panel provided in the present application.

FIG. 1 is a schematic structural diagram of an embodiment of an integrated touch control display panel provided in the present application. In this embodiment, an integrated touch control display panel 100 includes a plurality of touch control sensing electrodes 11, extending along a first direction and arranged along a second direction, where the first direction may be perpendicular to the second direction.

As shown in FIG. 1, the touch control sensing electrode 11 may have a grid structure, and the touch control sensing electrode 11 includes a plurality of electrically connected metal electrodes 111. The metal electrode 111 includes a plurality of electrically connected sub-metal electrodes n1, n2, n3, and n4, and the width of the sub-metal electrodes n1, n2, n3, and n4 is a, where 2.5 µm≤a≤3 µm.

Particularly, the sub-metal electrodes may be metal wires, and the width of the sub-metal electrodes n1, n2, n3, and n4 is the line width of the metal wires forming the sub-metal electrodes. That is, the width of any one of the metal wires in the metal electrode 111 is in the range of 2.5 to 3 µm. Specifically, the width of the metal wires in the metal electrode may be 2.6 µm, 2.7 µm, 2.8 µm, 2.9 µm, and other values.

By way of example, in FIG. 1, the smallest repeating unit of the grid structure is the metal electrode 111, and individual metal electrodes 111 of the same touch control sensing electrode 11 are electrically connected to each other. Each of the touch control sensing electrodes 11 may include a plurality of metal electrodes 111 disposed along a first direction and a second direction. In a specific implementation, the first direction may be perpendicular to the second direction, and the first direction may also be at an angle of less than 90° with respect to the second direction.

In a further embodiment, the integrated touch control display panel 100 may further include touch control sensing signal lines 12, and the touch control sensing signal lines 12 have a line width of b, wherein 3 µm≤b≤10 µm. For example, the touch control sensing signal lines 12 may have a line width of 4 µm, 5 µm, 6 µm, 7 µm, 8 µm, 9 µm, and other values. The line width of the touch control sensing signal lines 12 is in the range of 3 to 10 µm. This can reduce the area of the frame and facilitate stable transmission of the signal.

Each of the touch control sensing electrodes 11 is electrically connected to at least one of the touch control sensing signal lines 12. The touch control sensing signal lines 12 are used to receive a touch control sensing signal returned from the touch control sensing electrode. Specifically, each of the touch control sensing electrodes 11 may be electrically connected to a plurality of touch control sensing signal lines 12, and the plurality of touch control sensing signal lines 12 may be electrically connected to the touch control sensing electrode 11 at the same metal electrode 111.

In some embodiments, the touch control sensing signal lines 12 may transmit a touch control scan signal to the touch control sensing electrode 11. The touch control sensing signal lines 12 may be connected to a flexible printed circuit (FPC) on the integrated touch control display panel 100, and send a signal to a driver chip via the FPC, or receive a signal sent from the driver chip via the FPC.

The integrated touch control display panel 100 includes a display region AA' and non-display regions B1B1' and B2B2'. The touch control sensing electrodes 11 are disposed in the display region AA', and are used to sense touch control points on the integrated touch control display panel 100. In this embodiment, a pixel region and a black matrix are provided on the integrated touch control display panel 100. The pixel region is a region where the light penetrates through the display panel, and thus a high light transmittance may be necessary; and the black matrix is a region where the light is blocked. The metal electrode 111 in the touch control sensing electrode 11 may be formed by connecting a plurality of metal wires, and the position of wiring of the metal wires may run through the pixel region. Due to the small width of the metal wires, the blocking effect of the metal wires on the light in the pixel region can be ignored, so that the light transmittance of the display region is not affected.

The non-display regions B1B 1' and B2B2' may be provided with the touch control sensing signal lines 12 therein. The touch control sensing signal lines 12 do not interfere with the wiring in the display region AA', and by providing the touch control sensing lines 12 in the non-display regions B1B1' and B2B2', the blocking effect on the light in the display region AA' is avoided, thereby ensuring the display effect.

It should be noted that for the purpose of ensuring the touch control sensitivity and touch control precision at the boundary of the display region AA', in some embodiments of the present application, the touch control sensing electrode 11 may extend into the non-display regions B1B1' and B2B2'. To ensure the signal quality, the touch control sensing signal lines 12 may extend into the display region AA'.

In this embodiment, each of the touch control sensing electrodes 11 may be connected to a plurality of touch control sensing signal lines 12 at different positions of the touch sensing electrode 11. For example, each of the touch control sensing electrodes 11 may be connected, respectively at two ends thereof in the direction of extension, to an FPC via a touch control sensing signal line. The plurality of touch control sensing signal lines 12 simultaneously connected to the same touch control sensing electrode 11 may transmit signals simultaneously. When touch control takes place, the driver chip can receive touch control sensing signals transmitted from the plurality of touch control sensing signal lines 12 connected to the same touch control sensing electrode 11. The touch control sensing signal lines 12 acquires signals from a plurality of different positions of the touch control sensing electrode 11, and the driver chip can calculate a more accurate touch control position from the plurality of signals.

In the integrated touch control display panel provided in this embodiment, the light transmittance of the display region is increased by reducing the width of the metal electrodes forming the touch control sensing electrode, so as to improve the display effect. Meanwhile, by setting the minimum width of the metal electrodes in a range of greater than 2.5 µm, the influence on the touch control effect caused by breakage of the metal electrode can be avoided.

Figure 2:
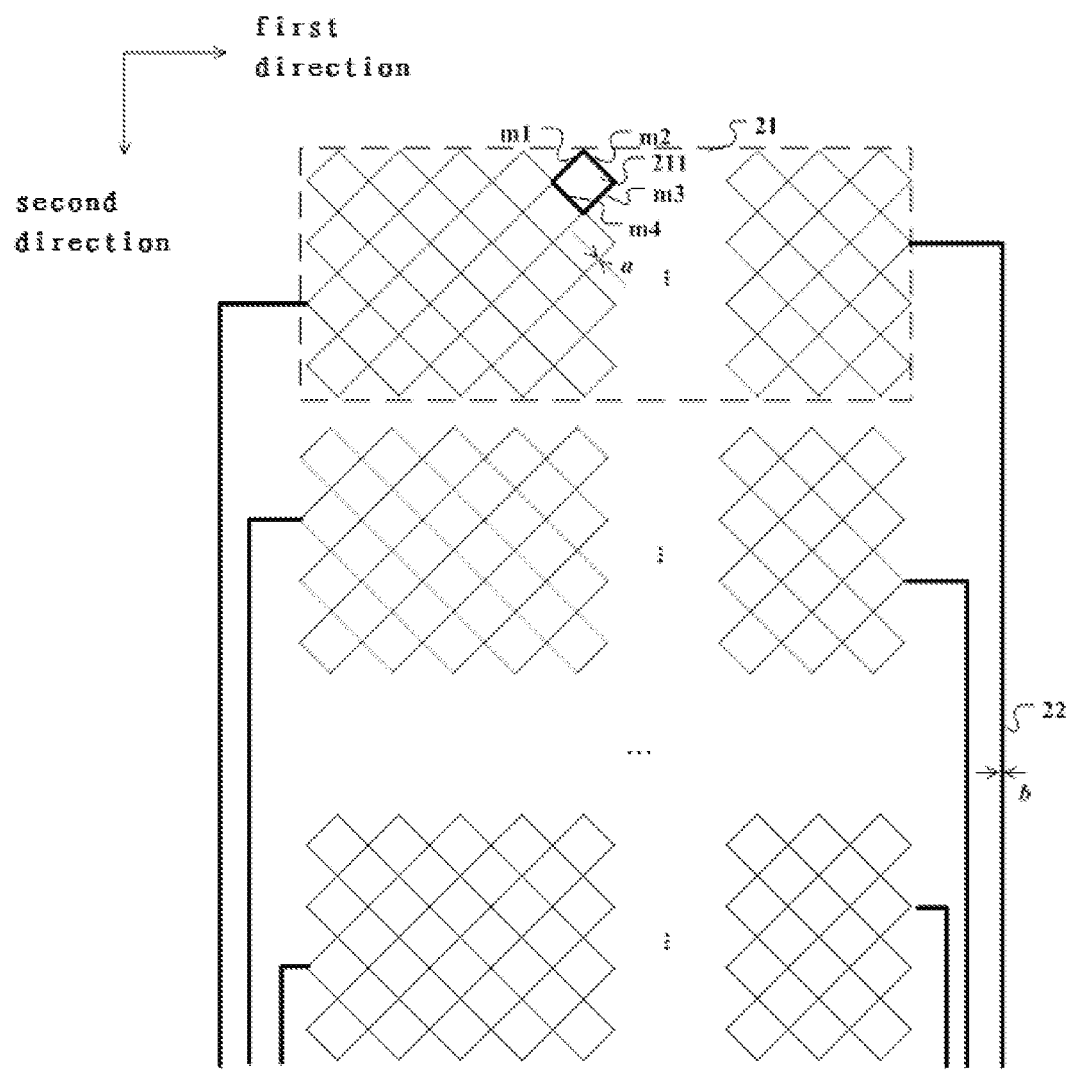
FIG. 2 is a schematic structural diagram of an embodiment of a touch control sensing electrode provided in the present application.
Figure 3:
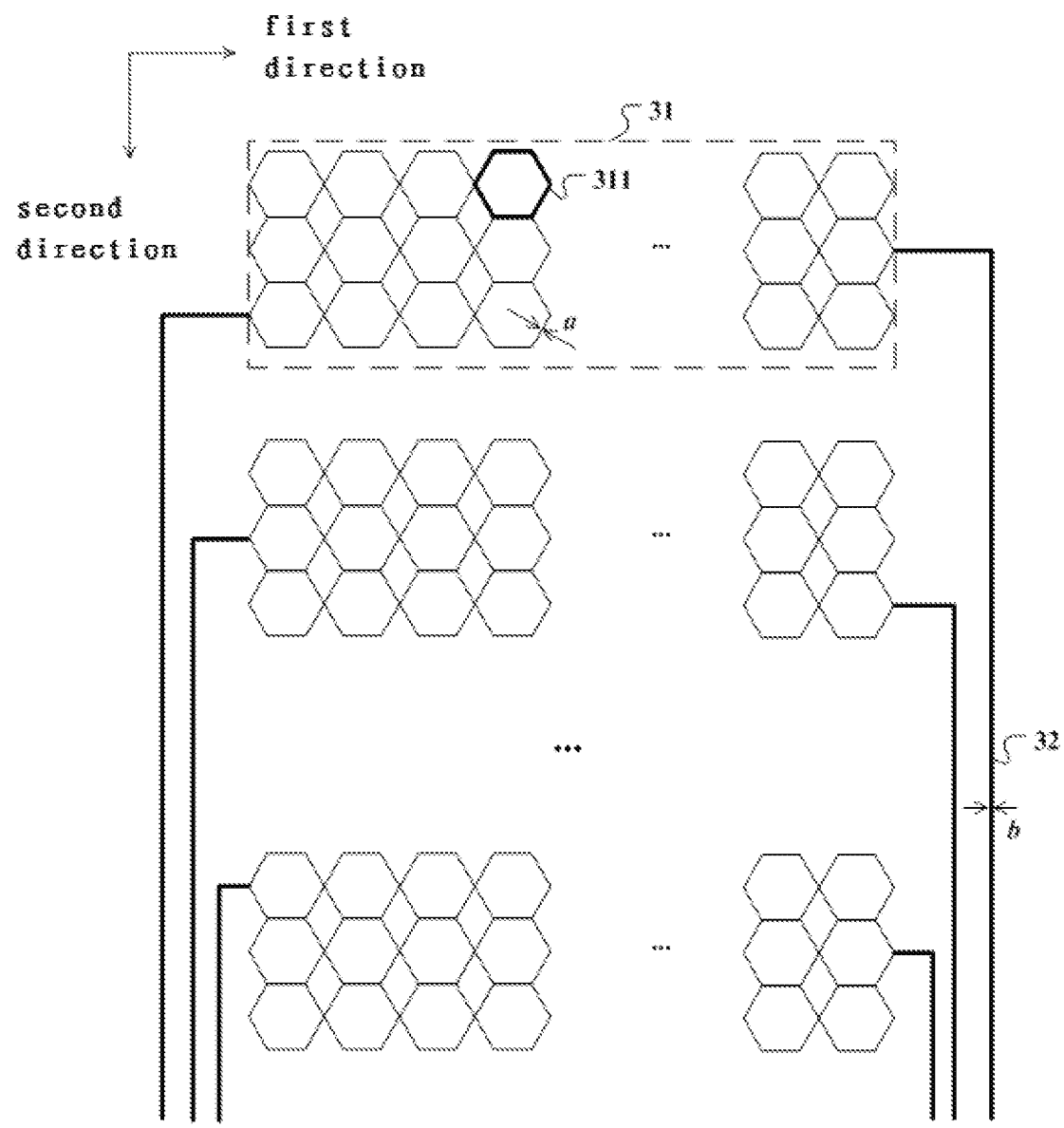
FIG. 3 is a schematic structural diagram of another embodiment of the touch control sensing electrode provided in the present application.

In some embodiments, a plurality of metal electrodes belonging to the same touch control sensing electrode may be arranged as arrays along the first direction and the second direction, where the first direction is perpendicular to the second direction. FIGS. 2 and 3 show schematic structures of two specific embodiments of the touch control sensing electrode provided in the present application.

As shown in FIG. 2, an integrated touch control display panel is provided with a plurality of touch control sensing electrodes 21 extending along a first direction and arranged along a second direction thereon. The touch control sensing electrodes 21 have a grid structure, and include a plurality of electrically connected metal electrodes 211. The metal electrodes 211 include a plurality of sub-metal electrodes m1, m2, m3, and m4, and each of the sub-metal electrodes m1, m2, m3, and m4 is a linear type electrode, and has a width a satisfying 2.5 µm≤a≤3 µm.

Each of the metal electrodes may include a plurality of sub-metal electrodes, and the metal electrode is formed by connecting of the plurality of sub-metal electrodes in series.

Among the plurality of sub-metal electrodes belonging to the same metal electrode, at least one sub-metal electrode extends in a direction different from that of another sub-metal electrode. That is to say, the plurality of sub-metal electrodes may have at least two extension directions. For example, in a metal electrode 211 in the embodiment as shown in FIG. 2, the sub-metal electrodes m1 and m3 extend in a direction different from that of the sub-metal electrodes m2 and m4.

It can be seen from FIG. 2 that the four sub-metal electrodes m1, m2, m3, and m4 are connected in series, and are looped to form a quadrilateral metal electrode 211. A plurality of quadrilateral metal electrodes 211 are electrically connected to each other at the vertexes of the quadrilateral shape, to form a grid structure.

In FIG. 2, the line width b of the touch control sensing signal line 22 satisfies 3 μm≤b≤10 μm. The touch control sensing signal line 22 is electrically connected to the metal electrode 211 that is closest to the non-display region B1B1' in the touch control sensing electrode 21 or is electrically connected to the metal electrode 211 that is closest to the non-display region B2B2'.

In FIG. 3, a touch control sensing electrode 31 includes a plurality of electrically connected metal electrodes 311. The metal electrode 311 is a hexagonal electrode including six sub-metal electrodes connected in series, where each of the sub-metal electrodes may be a linear type electrode, and the line width a of the sub-metal electrode satisfies 2.5 μm≤a≤3 μm.

The width b of the touch control sensing signal line 32 satisfies the following condition: 3 μm≤b≤10 μm. The touch control sensing signal line 32 is electrically connected to the metal electrode 311 that is closest to the non-display region B1B1' or the metal electrode 311 that is closest to the non-display region B2B2' in the touch control sensing electrode 31.

It should be noted that in FIGS. 2 and 3, exemplary structures of the touch control sensing electrode provided in embodiments disclosed in the present application are illustrated respectively with a quadrilateral or hexagonal metal electrode that is the smallest unit forming the touch control sensing electrode of grid structure as an example. However, in other embodiments disclosed in the present application, the smallest unit of the touch control sensing electrode, that is, the metal electrode, may have any closed shapes, for example, oval, any polygonal shapes, irregular closed shapes, and others. A plurality of the smallest units, that is, the metal electrodes, is sequentially disposed in the first direction and the second direction and electrically connected to each other, to form the touch control sensing electrode.

In the embodiments shown in FIGS. 2 and 3, the metal electrode in the touch control sensing electrode has a small area, thus a high mutual capacitor is formed between the touch control sensing electrode and the touch control emitting electrode, so as to improve the touch control sensitivity when applied in touch control.

Figure 4:
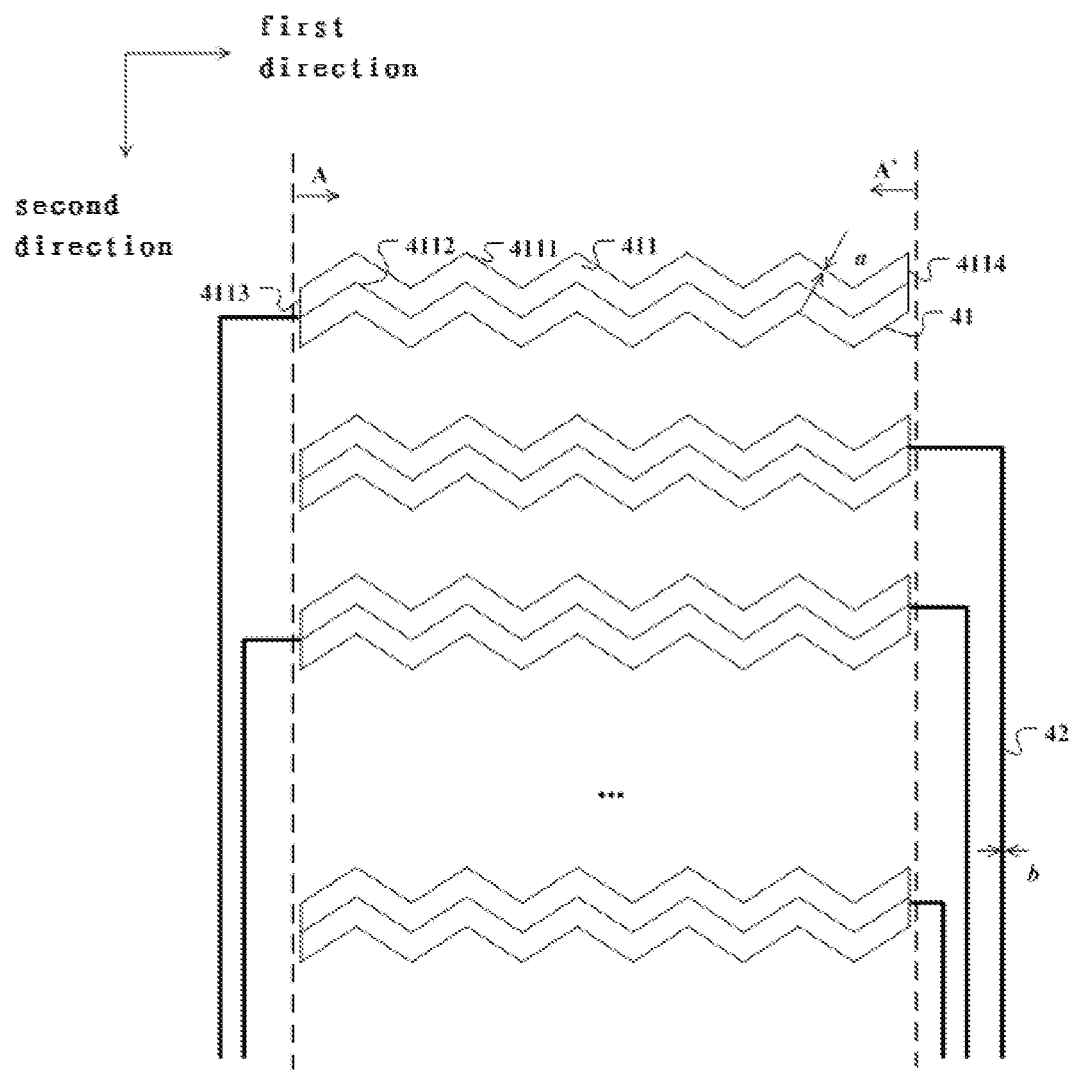
FIG. 4 is a schematic structural diagram of a further embodiment of the touch control sensing electrode provided in the present application.
Figure 5:
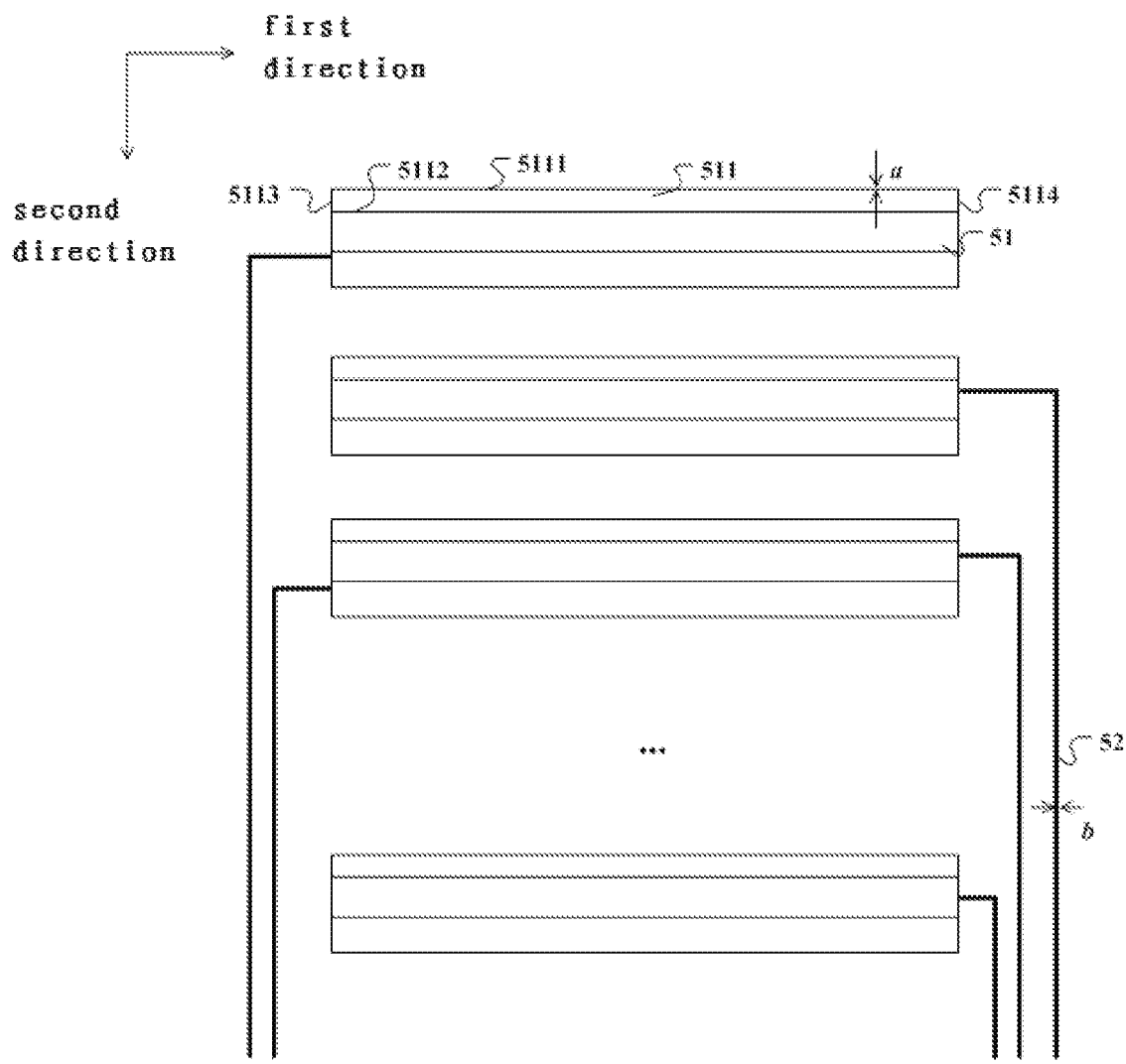
FIG. 5 is a schematic structural diagram of still another embodiment of the touch control sensing electrode provided in the present application.

In some other embodiments, a plurality of metal electrodes belonging to the same touch control sensing electrode may be periodically disposed along the second direction. FIGS. 4 and 5 show exemplary structures of two embodiments of the metal electrode having periodical arrangement in the second direction in the touch control sensing electrode.

As shown in FIG. 4, the first direction is perpendicular to the second direction. A plurality of touch control sensing electrodes 41 extends along the first direction, and is periodically arranged along the second direction. The display region AA' of the integrated touch control display panel has a first boundary A and a second boundary A', wherein the first boundary A and the second boundary A' are two opposite boundaries of the display region AA' extending along the second direction. The display region AA' is provided with the touch control sensing electrodes 41 therein. The touch control sensing electrode 41 has a grid structure including a plurality of metal electrodes 411, where each of the metal electrodes 411 includes a plurality of sub-metal electrodes 4111, 4112, 4113, and 4114. The sub-metal electrodes 4111 and 4112 included in the metal electrode 411 and provided in the display region AA' extend, along the first direction, from the first boundary A of the display region AA' to the second boundary A' of the display region AA'; and the sub-metal electrodes 4113 and 4114 may extend along a direction intersecting with the first direction. The sub-metal electrodes 4111 and 4112 are electrically connected via the sub-metal electrodes 4113 and 4114. The line width a of the sub-metal electrodes 4111, 4112, 4113, and 4114 satisfies the following condition: 2.5 μm≤a≤3 μm.

In some embodiments, the metal electrode 411 may extend into the non-display regions B1B1' and B2B2'. In this case, the sub-metal electrodes 4111 and 4112 in the metal electrode 411 extend along the first direction, from the non-display region B1B1', through the display region AA', into the non-display region B2B2'; and the sub-metal electrodes 4113 and 4114 may extend into the non-display regions B1B1' and B2B2'. The integrated touch control display panel further includes touch control sensing signal lines 42 having a width b satisfying 3 μm≤b≤10 μm. Each of the touch control sensing electrodes 41 is electrically connected to at least one of the touch control sensing signal lines 42.

In this embodiment, the touch control sensing signal line 42 may be connected to the touch control sensing electrode 41 at any position of any one of the metal electrodes 411. Optionally, the non-display regions are provided with the touch control sensing signal lines 42, and the touch control sensing signal line 42 is electrically connected to the touch control sensing electrode 41 at one end of the metal electrode 411 in the direction of extension (that is, the first direction).

As shown in FIG. 5, the first direction is perpendicular to the second direction. A plurality of touch control sensing electrodes 51 extend along the first direction, and are periodically disposed along the second direction. The display region AA' of the integrated touch control display panel has a first boundary A and a second boundary A', where the first boundary A and the second boundary A' are two opposite boundaries of the display region AA', and the first boundary A and the second boundary A' extend along the second direction. The touch control sensing electrode 51 has a grid structure including a plurality of metal electrodes 511, where each of the metal electrodes 511 includes a plurality of sub-metal electrodes 5111, 5112, 5113, and 5114. The sub-metal electrodes 5111 and 5112 included in the metal electrode 511 and provided in the display region AA' extend, along the first direction, from the first boundary A of the display region AA' to the second boundary A' of the display region AA', and the sub-metal electrodes 5113 and 5114 may extend along a direction intersecting with the first direction. The sub-metal electrodes 5111 and 5112 are electrically connected via the sub-metal electrodes 5113 and 5114. The width a of the sub-metal electrodes 5111, 5112, 5113, and 5114 satisfies 2.5 μm≤a≤3 μm.

In some embodiments, the metal electrode 511 may extend into the non-display regions B1B1' and B2B2'. In this case, the sub-metal electrodes 5111 and 5112 in the metal electrode 511 extend along the first direction, from the non-display region B1B1', through the display region AA', into the non-display region B2B2'; and the sub-metal electrodes 5113 and 5114 may extend into the non-display regions B1B1' and B2B2'.

The integrated touch control display panel further includes touch control sensing signal lines 52 having a width b satisfying 3 µm≤b≤10 µm. Each of the touch control sensing electrodes 51 is electrically connected to at least one of the touch control sensing signal lines 52.

In this embodiment, the touch control sensing signal line 52 may be connected to the touch control sensing electrode 51 at any position of any one of the metal electrodes 511. For example, the touch control sensing signal line 52 may be connected to a position at midpoint of the linear type metal electrode 511. Optionally, the touch control sensing signal lines 52 are located in the non-display regions, and the touch control sensing signal line 52 is electrically connected to the touch control sensing electrode 51 at one end of the metal electrode 511 in the extension direction (that is, the first direction).

The sub-metal electrodes 4111 and 4112 in FIG. 4 are of fold line type, and the sub-metal electrode is formed by sequentially connecting a plurality of fold line metal wire segments periodically disposed along the first direction. The sub-metal electrodes 5111 and 5112 in FIG. 5 are of linear type. The metal electrode 511 is formed by electrically connecting, via the sub-metal electrodes 5113 and 5114 extending along the second direction, a plurality of linear type sub-metal electrodes disposed along the second direction to each other. In other embodiments of the present application, the sub-metal electrode may also be of other line types, for example, a curve type metal electrode.

Compared with the structures of the touch control sensing electrodes in the integrated touch control display panels as shown in FIGS. 2 and 3, each metal electrode in FIGS. 4 and 5 has an increased area, such that the resistance of the touch control sensing electrode is reduced, thereby decreasing the loss of signal during transmission.

The pixel region in the panel is generally a rectangular region having boundaries extending along the first direction and the second direction. It can be known from FIGS. 2, 3, 4, and 5 that the extension direction of the sub-metal electrodes in the embodiments of the present application may be inconsistent with the boundary of the pixel region, and the sub-metal electrodes may run through the pixel region. The influence on the light transmittance of the pixel region caused by the touch control sensing electrodes is attenuated for the small width of the sub-metal electrodes.

It can be seen from above embodiments that in the circumstance in which the width a of the sub-metal electrodes is set to satisfy 2.5 µm≤a≤3 µm for the grid touch control sensing electrode formed with a plurality of metal electrodes, the shape of the metal electrodes and the size of the closed pattern formed with the sub-metal electrodes can be designed more flexibly, as desired by the touch control sensitivity.

Figure 6:
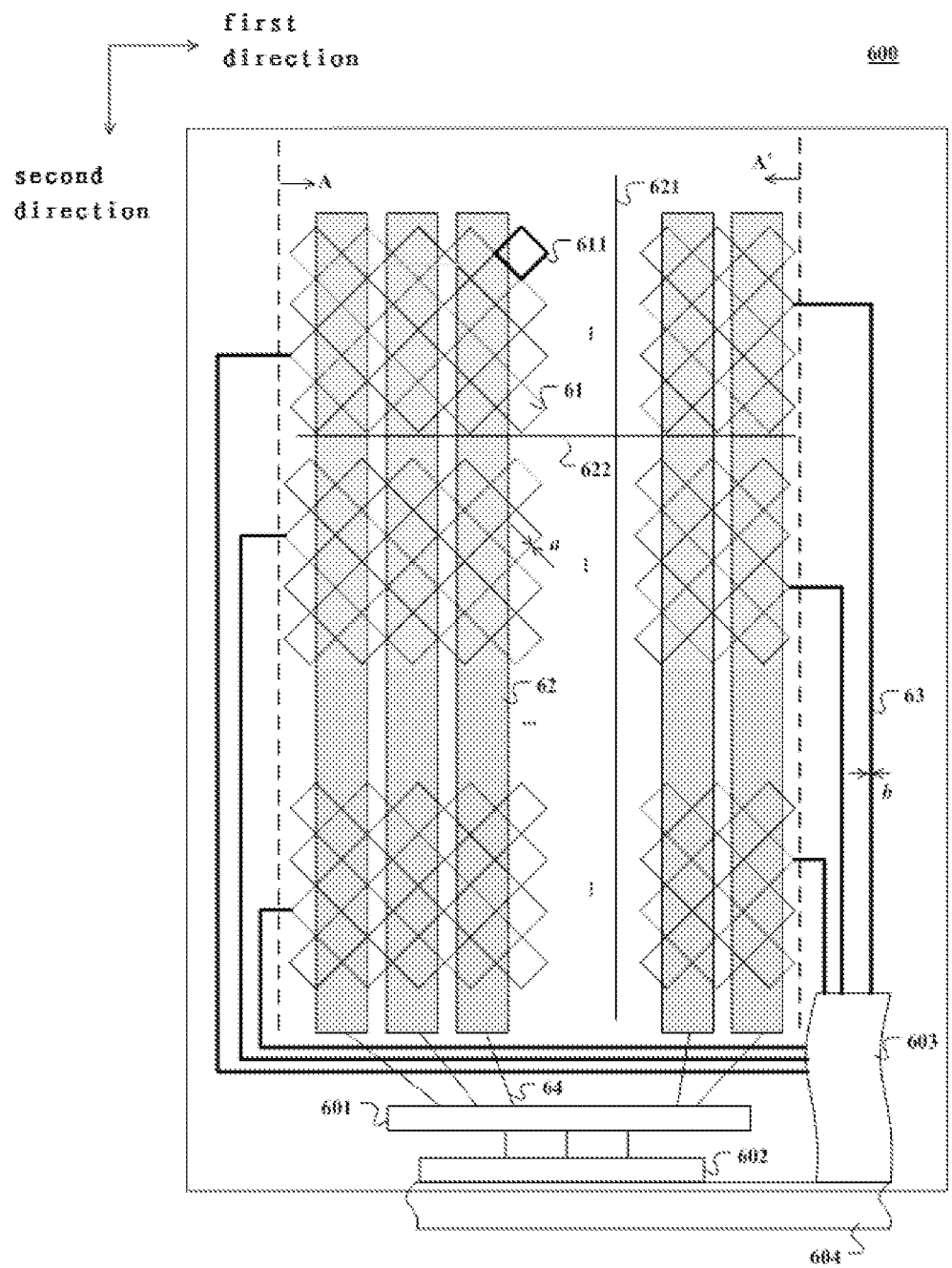
FIG. 6 is a schematic structural diagram of another embodiment of the integrated touch control display panel provided in the present application.

FIG. 6 shows a schematic structural diagram of another embodiment of the integrated touch control display panel provided in the present application.

As shown in FIG. 6, an integrated touch control display panel 600 includes touch control sensing electrodes 61 and touch control emitting electrodes 62. The touch control sensing electrodes 61 and the touch control emitting electrodes 62 are disposed in the display region AA'. The touch control sensing electrodes 61 extend along a first direction and are arranged along a second direction. The touch control sensing electrode 61 has a grid structure and includes a plurality of electrically connected metal electrodes 611. The metal electrode 611 includes a plurality of electrically connected sub-metal electrodes, and the sub-metal electrodes has a width a, where 2.5 µm≤a≤3 µm.

The touch control emitting electrode 62 is a strip-like electrode, and may be made with an electrically conductive material, for example, an indium tin oxide (ITO) electrode. The touch control emitting electrode 62 may extend in a direction intersecting with that of the touch control sensing electrode 61. In some embodiments, the touch control emitting electrode 62 extends in a direction perpendicular to that of the touch control sensing electrode 61. For example, in FIG. 6, the touch control sensing electrode 61 extends along the first direction, and the touch control emitting electrode 62 extends along the second direction perpendicular to the first direction.

In some embodiments, the integrated touch control display panel 600 further includes a data line 621 and a scan line 622. The data line is used to provide a data signal to sub-pixels in the display region AA', and the scan line is used to transmit a scan signal to the sub-pixels. During the time when a row of sub-pixels are switched on, each data line transmits a data signal to each column of sub-pixels respectively, and the sub-pixels perform display based on the received data signal. The touch control emitting electrode 62 may extend in a direction consistent with that of the data line. The touch control sensing electrode 61 may extend in a direction consistent with that of the scan line. Only one data line 621 and one scan line 622 are schematically shown in FIG. 6. However, in a specific implementation, the integrated touch control display panel may include a plurality of data lines that parallel to each other, and a plurality of scan lines that parallel to each other.

The integrated touch control display panel 600 may be further provided with touch control sensing signal lines 63 and touch control emitting signal lines 64 thereon. Each of the touch control sensing electrodes 61 is electrically connected to at least one of the touch control sensing signal lines 63, and each of the touch control emitting electrodes 62 is electrically connected to at least one of the touch control emitting signal lines 64. The touch control emitting signal line 64 may be electrically connected to a touch control drive circuit 601, and the touch control drive circuit 601 is electrically connected to a driver chip 602. The touch control sensing signal line 63 may be electrically connected to an FPC 603, and the FPC 603 is connected to an FPC driver chip 602 via a master FPC 604.

A mutual capacitor is formed between the touch control emitting electrode 62 and the touch control sensing electrode 61 at the position of intersection. During touch control detection, the driver chip 602 may provide a touch control emitting signal to the touch control emitting electrode 62, and receive a touch control sensing signal returned from the touch sensing electrode 63. If the returned touch control sensing signal is detected to be inconsistent with the touch control emitting signal, it can be determined that touch control takes place at a position corresponding to the intersection point of the touch control sensing electrode 61 and the touch control emitting electrode 62.

In some optional implementations of this embodiment, the touch control emitting electrode 62 may be multiplexed as a common electrode. When the integrated touch control display panel 600 is in a display status, the driver chip 602 may provide a common voltage signal used for display to the touch control emitting electrode 62, and provide a data signal to a pixel electrode through the data line. In this case, the liquid crystal in the integrated touch control display panel 600 rotates, as driven by an electric field formed by the common electrode and the pixel electrode, such that the polarization orientation of the emergent light rotates. The intensity of the emergent light is controlled by a polarizer, thus achieving the display of the sub-pixels at different levels of brightness in the image.

In the integrated touch control display panel 600, the touch control sensing electrode 61 has a grid structure, and includes a plurality of metal electrodes 611. The metal electrode 611 includes a plurality of sub-metal electrodes having a line width a satisfying 2.5 μm≤a≤3 μm, such that the grid touch control sensing electrode has a good electrical connection, and the influence on the display effect due to a decreased light transmittance resulting from a too wide sub-metal electrode is avoided.

Figure 7:
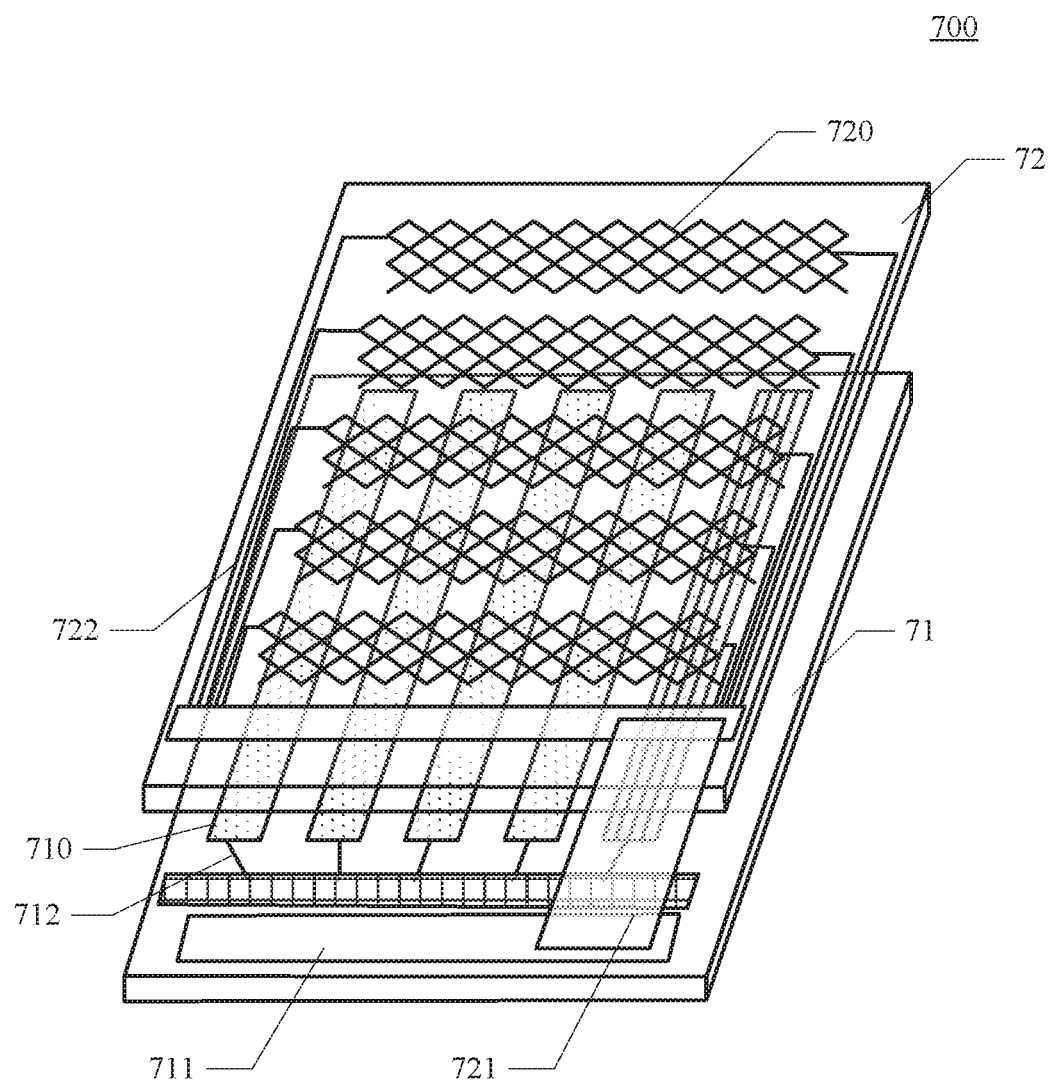
FIG. 7 is a schematic structural diagram of a further embodiment of the integrated touch control display panel provided in the present application.

FIG. 7 shows a schematic structural diagram of another embodiment of the integrated touch control display panel provided in the present application.

As shown in FIG. 7, an integrated touch control display panel 700 includes an array substrate 71 and a color film substrate 72 provided opposite to the array substrate 71. Touch control emitting electrodes 710 are provided on the array substrate 71, and touch control sensing electrodes 720 are provided on the color film substrate 72. Each of the touch control emitting electrodes 710 extends in the same direction, and each of the touch control sensing electrodes 720 extends in a direction intersecting with that of the touch control emitting electrodes 710.

The touch control sensing electrode 720 may have a grid structure, and includes a plurality of electrically connected metal electrodes. Each of the metal electrodes may include a plurality of electrically connected sub-metal electrodes, and the sub-metal electrode has a width a satisfying 2.5 μm≤a≤3 μm.

Each of the touch control emitting electrodes 710 is electrically connected to at least one touch control emitting signal line 712, and each of the touch control sensing electrodes 720 is electrically connected to at least one touch control sensing signal line 722, where the touch control sensing signal line 722 has a width b satisfying 3 μm≤b≤10 μm.

The integrated touch control display panel 700 may further include a driver IC 711 and a flexible circuit board 721, where the touch control emitting electrode 710 is connected to the driver IC 711, and the touch control sensing electrode 720 is connected to the driver IC 711 via the flexible circuit board 721.

It should be understood that the display panel may further include some generally known structures, such as a liquid crystal layer provided between the array substrate 71 and the color film substrate 72, spacer supports for supporting the liquid crystal layer, cover glass, backlight sources, and others. The liquid crystal layer deflects under the action of an electric field formed between a pixel electrode and the touch control emitting electrode 710, to achieve the display of an image. These generally known structures are not shown in FIG. 7 for the purpose of avoiding unnecessarily obscuring the present application.

In the display panel shown in FIG. 7, the touch control sensing electrodes 720 are provided on the color film substrate close to the surface of the display panel, through which the touch control sensitivity can be improved. The mutual capacitor formed between the touch control sensing electrode 720 of grid structure and the touch control emitting electrode can function for touch control precision. Compared with a strip-like touch control sensing electrode, the electric resistance is reduced. Also, due to the metal wire forming the grid having a line width in the range of 2.5 μm to 3 μm, the influence on the light transmittance is avoided in the circumstance the electrical connection between the sub-metal electrodes in the grid structure is ensured to be stable.

Figure 8:
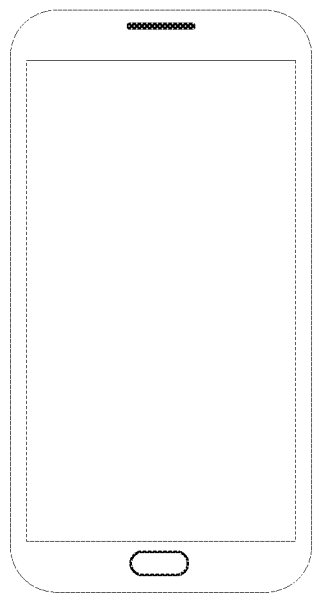
FIG. 8 is a schematic diagram of an embodiment of an integrated touch control display device provided in the present application.

As shown in FIG. 8, the present application also provides an integrated touch control display device 800, including the integrated touch control display panel described in various embodiments above. In the integrated touch control display device, the blocking effect of the touch control sensing electrodes on the light in the display region is attenuated by reducing the width of the sub-metal electrodes in the grid touch control sensing electrode, thereby improving the display effect.

The forgoing descriptions are only illustrative of preferred embodiments of and technical principles applied in the present application. It should be understood by those skilled in the art that the protection scope of the present application is not limited to the technical solutions formed by specifically combining the above technical features, and also embraces other technical solutions formed by arbitrarily combining the above technical features or equivalents thereof without departing from the inventive concept, for example, the technical solutions formed by substituting the above technical features with/for the technical features having similar functions (without limitation) disclosed in the present application.

What is claimed is:

1. An integrated touch control display panel having a display region and non-display regions, the integrated touch control display panel comprising:

a plurality of touch control sensing electrodes extending along a first direction and arranged along a second direction, the touch control sensing electrodes having a grid structure and comprising a plurality of electrically connected metal electrodes, the metal electrodes comprising a plurality of electrically connected sub-metal electrodes, and the sub-metal electrodes having a width of a, wherein a is less than or equal to 3 micrometer (3 μm) and is greater than or equal to 2.5 micrometer (2.5 μm), the plurality of metal electrodes are periodically disposed in the second direction, the sub-metal electrodes included in each of the plurality of metal electrodes comprise two first sub-metal electrodes extending along the first direction from a first boundary of the display region to a second boundary of the display region, two second sub-metal electrodes extending along the second direction, and at least one third sub-metal electrode extending along the first direction from the first boundary to the second boundary, the two first sub-metal electrodes are electrically connected to each other through the two second sub-metal electrodes, the two first sub-metal electrodes and the two second sub-metal electrodes are connected in series to form a closed polygonal metal electrode, the at least one third sub-metal electrode is disposed between the two first sub-metal electrodes and is electrically connected to the two second sub-metal electrodes; the first boundary and the second boundary being two opposite boundaries of the display region, the first boundary and the second boundary extending along the second direction, and the second direction being perpendicular to the first direction.

2. The integrated touch control display panel according to claim 1, further comprising touch control sensing signal lines, wherein
each of the touch control sensing signal lines has a line width of b, wherein b is less than or equal to 10 micrometer (10 μm) and is greater than or equal to 3 micrometer (3 μm).

3. The integrated touch control display panel according to claim 2, wherein
the touch control sensing electrodes are disposed in the display region, and the touch control sensing signal lines are disposed in the non-display regions.

4. The integrated touch control display panel according to claim 1, wherein each of the touch control sensing electrodes is electrically connected to at least one of the touch control sensing signal lines.

5. The integrated touch control display panel according to claim 4, wherein the touch control sensing signal lines are electrically connected to the metal electrode in the touch control sensing electrode that is closest to the non-display region.

6. The integrated touch control display panel according to claim 1, wherein the sub-metal electrodes are selected from one of:
linear type metal electrodes, fold line type metal electrodes, and curve type metal electrodes.

7. The integrated touch control display panel according to claim 1, wherein each of the touch control sensing electrodes is electrically connected to at least one of the touch control sensing signal lines.

8. The integrated touch control display panel according to claim 3, further comprising touch control emitting electrodes, wherein
each of the touch control emitting electrodes is a strip-like electrode, and an extension direction of the touch control emitting electrodes intersect with an extension direction of the touch control sensing electrodes.

9. The integrated touch control display panel according to claim 8, wherein the extension direction of the touch control emitting electrodes are perpendicular to the extension direction of the touch control sensing electrodes.

10. The integrated touch control display panel according to claim 9, further comprising a data line and a scan line, wherein
the extension direction of the touch control emitting electrodes match the extension direction of the data line, and the extension direction of the touch control sensing electrodes match the extension direction of the scan line.

11. The integrated touch control display panel according to claim 8, wherein the touch control emitting electrodes are located in the display region.

12. The integrated touch control display panel according to claim 8, wherein the touch control emitting electrodes are multiplexed as common electrodes.

13. The integrated touch control display panel according to claim 12, comprising an array substrate and a color film substrate, wherein
the array substrate is provided opposite to the color film substrate; and
the touch control emitting electrodes are provided on the array substrate, and the touch control sensing electrodes are provided on the color film substrate.

14. An integrated touch control display device, comprising an integrated touch control display panel having a display region and non-display regions, the integrated touch control display panel comprises:
a plurality of touch control sensing electrodes extending along a first direction and arranged along a second direction,
the touch control sensing electrodes having a grid structure and comprising a plurality of electrically connected metal electrodes, the metal electrodes comprising a plurality of electrically connected sub-metal electrodes, and the sub-metal electrodes having a width of a, wherein a is less than or equal to 3 micrometer (3 μm) and is greater than or equal to 2.5 micrometer (2.5 μm),
the plurality of metal electrodes are periodically disposed in the second direction, the sub-metal electrodes included in each of the plurality of metal electrodes comprise two first sub-metal electrodes extending along the first direction from a first boundary of the display region to a second boundary of the display region, two second sub-metal electrodes extending along the second direction, and at least one third sub-metal electrode extending along the first direction from the first boundary to the second boundary, the two first sub-metal electrodes are electrically connected to each other through the two second sub-metal electrodes, the two first sub-metal electrodes and the two second sub-metal electrodes are connected in series to form a closed polygonal metal electrode, the at least one third sub-metal electrode is disposed between the two first sub-metal electrodes and is electrically connected to the two second sub-metal electrodes; the first boundary and the second boundary being two opposite boundaries of the display region, the first boundary and the second boundary extending along the second direction, and the second direction being perpendicular to the first direction.

* * * * *